United States Patent [19]

Pulkowski et al.

[11] Patent Number: 5,251,852
[45] Date of Patent: Oct. 12, 1993

[54] THERMAL FUEL TRANSFER AND TANK ISOLATION TO REDUCE UNUSABLE FUEL

[75] Inventors: Joseph A. Pulkowski, Ringoes; Keith Davies, Robbinsville; Marc B. Young, Plainsboro; Daniel A. Lichtin, West Windsor, all of N.J.

[73] Assignee: General Electric Company, East Windsor, N.J.

[21] Appl. No.: 755,723

[22] Filed: Sep. 6, 1991

[51] Int. Cl.⁵ ............................................. B64G 1/22
[52] U.S. Cl. ............................... 244/135 C; 244/172
[58] Field of Search ........... 244/135 R, 135 C, 158 R, 244/172, 169; 137/571, 209, 558; 222/1

[56] References Cited

U.S. PATENT DOCUMENTS

| | | | |
|---|---|---|---|
| 3,097,480 | 7/1963 | Sohn | 244/172 |
| 4,585,191 | 4/1906 | Blount | 244/158 R |
| 4,880,185 | 11/1989 | Apfel | 244/172 |
| 4,923,152 | 5/1990 | Barkats | 244/172 |
| 5,058,834 | 10/1991 | Hubert | 244/135 C |
| 5,071,093 | 12/1991 | Perda | 244/158 R |

FOREIGN PATENT DOCUMENTS

| | | | |
|---|---|---|---|
| 2051246 | 1/1981 | United Kingdom | 244/172 |
| 2226999 | 7/1990 | United Kingdom | 244/172 |

OTHER PUBLICATIONS

Ellion et al., WO 87/07877 Pub. Dec. 1987.

Primary Examiner—Galen Barefoot
Attorney, Agent, or Firm—W. H. Meise; C. A. Berard; S. A. Young

[57] ABSTRACT

A spacecraft includes a pair of pressurized propellant tanks. The pressure may be provided from a common pressurant tank. Each propellant tank has a propellant output port. A manifold includes a first branch coupled between a common juncture and the output port of the first tank, and a second branch between the juncture and the output port of the second tank. At least the second tank is associated with a heater. A controllable valve, such as a normally open pyrovalve, is coupled in the second branch. In order to fully utilize the propellant in the tanks, the second tank is differentially heated relative to the first when the tanks are nearly empty, to create a tendency toward a pressure difference, which drives propellant from the second tank to the first. When all or most of the propellant is transferred, the valve is operated to close off the second branch of the manifold, to isolate the now-empty tank. The thruster continues to be operated from time to time, drawing the remaining propellant from the first tank. The heating may be performed at times of day and/or seasons of the year when the appropriate tank receives solar radiation. The fuel remaining can be directly measured, or the spacecraft is launched with a known amount of propellant in the tanks. The thrusters are operated from time to time for attitude control and/or stationkeeping, and records are kept of the cumulative fuel use.

1 Claim, 2 Drawing Sheets

THERMAL FUEL TRANSFER AND TANK ISOLATION TO REDUCE UNUSABLE FUEL

BACKGROUND OF THE INVENTION

This invention relates to spacecraft, and more particularly to spacecraft in which thrusters consume propellant or fuel from pairs of fuel tanks.

Spacecraft and artificial satellites are in widespread use for communication purposes and for remote sensing. The cost of manufacture and launch of a spacecraft is high. Consequently, once a spacecraft is in orbit, it is important to maintain it in operation for as long as possible. Many spacecraft are required to maintain certain attitudes and/or stations in order to properly perform their function. Electrically operated devices such as reaction wheels or magnetic torquers may be used to control attitude, and require no fuel or other expendables, but instead extract the required energy from solar panels. Even when reaction wheels or magnetic torquers are used, however, chemical monopropellant or bipropellant thrusters may be provided to allow unloading of momentum from the reaction wheels, to provide higher torque than that available from a magnetic torquer, or both. Additionally, reaction wheels and magnetic torquers are not suitable for stationkeeping maneuvers, so chemical thrusters may also be provided to maintain station.

Chemical thrusters include monopropellant and bipropellant thrusters, and also includes arcjets, in which electrical energy is supplied to the chemical reaction to increase the jet velocity. Each of these requires the use of propellant, which is loaded onto the spacecraft at the time of launch, and which is used sparingly in order to maximize lifetime. The end of the useful life (EOL) of a spacecraft is ordinarily taken to be that time at which the propellant available for attitude control or for stationkeeping is exhausted. It should be noted that a small amount of propellant may be held in reserve for use in ejecting the spacecraft from its orbital position at the end of its useful life.

In order to enhance the operational reliability of the spacecraft, many of the operating systems are provided with redundancy. For example, it is customary to provide more chemical thrusters than the minimum necessary to achieve the desired control, and to arrange the thrusters so that a single failure does not make attitude control and stationkeeping impossible. A common scheme is to provide thrusters in "odd" and "even" mutually redundant sets or half-systems. Similarly, the propellant (fuel in the case of a monopropellant engine or fuel and oxidizer in the case of a bipropellant engine) tanks are provided in pairs, and their interconnections with the thrusters are also provided in pairs.

A prior art spacecraft using monopropellant thrusters might include a pair of fuel tanks containing liquid fuel, and pressurized by pressurant gas flowing through a manifold or plenum to the two tanks. Helium is often used as a pressurant gas. The fuel output ports of the two tanks are coupled together by the two branches of a manifold, which connect at a common junction to a thruster supply manifold. The pressurant tank also pressurizes third and fourth fuel tanks, which supply fuel through the two branches of a second manifold to the supply manifold of a further set of monopropellant thrusters. As so far described, the only common element of this prior art arrangement is the pressurant tank. If desired, dual pressurant tanks may be provided, but the potential for failure of the pressurant tank is deemed to be low. Each of the two thruster sets of the above-described prior art arrangement may be operated independently to provide attitude control and stationkeeping. In the event of certain types of failure of a thruster of one of the thruster sets, such as a thruster control valve which cannot be closed or which leaks, a valve is closed in the manifold feeding that thruster, and that thruster set is no longer used. This leaves unused fuel in the tanks associated with the unusable thruster set. Valves in crossover pipes extending between the two half-systems may be opened under these conditions, so the remaining operable thruster set may use the fuel from both sets of tanks.

While many redundancy schemes are possible, a very common characteristic of such systems is the use of a pair of propellant tanks interconnected by a manifold, by which propellant is supplied to the thruster. In order to make use of the largest amount of the propellant stored in the tanks, it is desirable to draw equal amounts of fuel from each tank during each operation of the thrusters. The use of a common source of pressurant gas for each pair of tanks aids in maintaining equal pressure and therefore equal fuel flow. Also, the temperature difference between tanks of a pair is controlled and minimized by a differential heater controller or its equivalent. Efforts are made to match fluid flow conductances through the manifolds, plumbing and components such as filters, check valves and other valves. However, temperature differences still exist between propellant tanks of a pair, and fluid flow conductances are never perfectly matched. As a result, one of the tanks may be depleted of fuel (or propellant in the case of a bipropellent thruster) before the other.

When one propellant tank of a pair is depleted of liquid propellant before the other, pressurant gas appears at the junction point of the manifold. This tends to introduce one or more bubbles of gas into the liquid propellant flowing to the thrusters. Since the pressurant gas is ordinarily less dense and less viscous than the liquid fuel or propellant, the gas tends to flow to the thrusters in preference to liquid. The presence of a gas bubble may be disadvantageous, because the flow of gas through an arcjet can extinguish the jet, and other thrusters become inoperative during expulsion of the gas. However, the situation may be more serious than temporary inoperability during expulsion of a gas bubble, because once pressurant gas starts to flow, the gas continues to flow and may become depleted, leaving no pressurant remaining. When the pressurant is depleted, no pressure remains to drive the propellant from the tank which still contains liquid propellant. Thus, the depletion of propellant in one of a pair of interconnected propellant tanks can signify the end of the propellant supply from the tank pair, even though residual propellant remains in one tank. Thus, depletion of propellant in one tank of a pair may represent the practical end of life of the spacecraft.

The amount of unusable residual propellant in a modern large communication satellite is estimated to be in the neighborhood of 25 lbm, which may be sufficient for operation for several months. The value of an operating satellite may be on the order of one million dollars per week. An improved arrangement for the use of residual fuel is desirable.

SUMMARY OF THE INVENTION

A spacecraft includes a thruster and first and second propellant tanks, each of which includes a fluid port from which fluid propellant can flow. A controllable heater is coupled to at least the second tank. A manifold is coupled to the thruster, and includes a first branch coupled to the fluid propellant output port of the first tank and also includes a second branch coupled to the fluid propellant output port of the second tank. A controllable valve is coupled in the second branch of the manifold. The spacecraft is launched with the first and second tanks loaded with the same type of propellant. From time to time, the thruster is operated, and the propellant required therefor is drawn from the first and second tanks. The amount of fuel in at least the second tank is monitored, by direct measurement, or by maintaining records indicative of the amount of propellant remaining in the tanks. At a time when the amount of propellant in the second tank is reduced to less than half its initial amount, and preferably when it is almost completely depleted, a temperature differential is created between the first and second tanks. The temperature differential causes the pressurant gas in the second tank to expand, which drives at least a portion of the propellant from the second tank to the first tank by way of the manifold interconnection. During the step of creating a temperature difference and preferably after sufficient time for most or all of the remaining propellant to be expelled from the second tank into the first tank, the valve is closed, or shut off. The valve shut-off closes off the second branch of the manifold, which extends between the second tank and the common point of the manifold, to thereby isolate the second tank from the thruster and the first tank. Thereafter, the thruster is operated from time to time and the propellant required therefor is drawn from the first tank. The method may be performed at any time, so long as the fuel transfer between tanks occurs before either tank is completely empty. The method may be performed by differentially heating one tank using the heaters normally used for maintaining tank temperature, and in one embodiment is desirably performed during a solstice.

DESCRIPTION OF THE INVENTION

Figure 1:
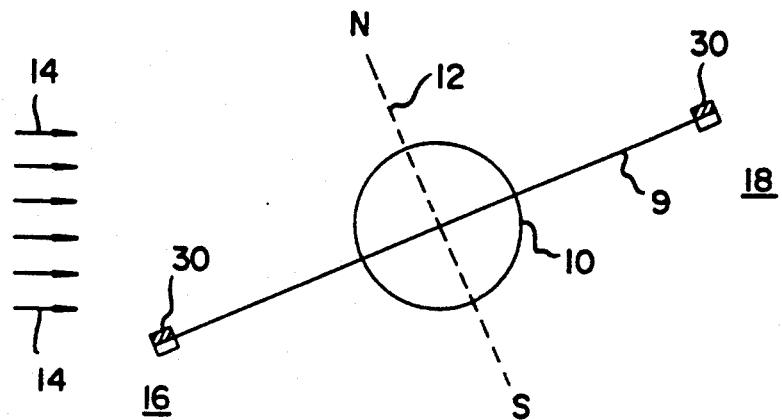
FIG. 1 is a view of the Earth illustrating an equatorial orbit and the direction of light from the sun near the summer solstice.

FIG. 1 illustrates the Earth 10 and its axis of rotation 12, with the North (N) pole indicated. The direction of sunlight during the summer solstice is illustrated by arrows 14. An equatorial orbit plane, seen in edge view, is designated 9. Two orbit positions, 16 and 18, are illustrated of a satellite 30 in an equatorial orbit lying in plane 9. If the equatorial orbit is geosynchronous, the satellite will move from position 16 to position 18, and back to position 16 once a day.

Figure 2:
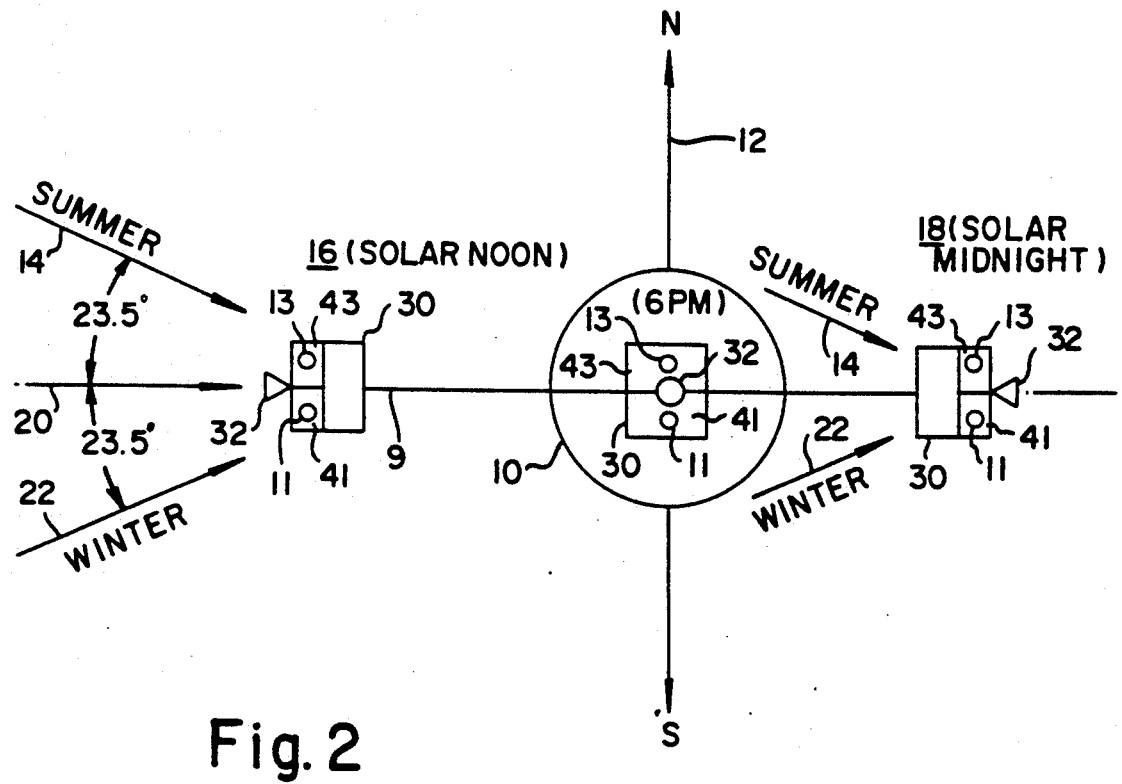
FIG. 2 illustrates the arrangement of propellant tanks on a spacecraft in accordance with an embodiment of the invention and the orientation of the tanks for aiding in creating a temperature differential during certain times of the day and seasons of the year.

FIG. 2 aids in understanding the heating of various elements of the spacecraft at various times of the year. In FIG. 2, elements corresponding to those of FIG. 1 are designated by like reference numerals. In FIG. 2, the direction of light during the summer solstice is indicated by arrow 14, and the light represented by arrow 14 is approximately 23.5° above the direction of light during the equinox, illustrated by arrow 20. The relative direction of light during the winter solstice is illustrated by 22. A spacecraft 30 is illustrated in position 16 (the solar noon position) and in position 18 (the solar midnight position). Also illustrated in conjunction with spacecraft 30 are the positions of a thruster or engine 32, and of propellant tanks 11 and 13 lying in quadrants 41 and 43 of the spacecraft.

The 6PM position of satellite 30 is also represented in FIG. 2. The 6PM position illustrated in FIG. 2 is provided as an aid to understanding. The North (N) and South (S) directions are represented by arrows.

From FIG. 2, it is clear that, near noon during the summer solstice, quadrant 43, containing propellant tank 13, is exposed to a substantial amount of direct sunlight, whereas quadrant 41, containing tank 11, is partially shaded and receives less light. Conversely, at noon during the winter solstice, tank 11 receives more direct sunlight. As a result of the effects of sunlight, tank 13 will be heated relative to tank 11 near noon of the summer solstice, and tank 11 will be heated in preference to tank 13 at noon during the winter solstice. The same type of preferential heating will occur at solar midnight of a solstice. In fact, at the summer solstice the North face of the spacecraft receives continuous sunlight, while the South face is continuously in shade. Thus, quadrant 43 will receive more heat than quadrant 41 over an entire 24-hour period at and near the summer solstice. Correspondingly, during and near the winter solstice, quadrant 41 is continuously preferentially or differentially heated to a maximum extent relative to quadrant 43, notwithstanding the daily cycle. During the almost six-month period extending from near equinox to near equinox, which period includes the winter solstice, at least some differential hearing of quadrant 41 occurs. During the half-year encompassing the summer solstice, quadrant 43 is preferentially heated relative to quadrant 41.

Figure 3:
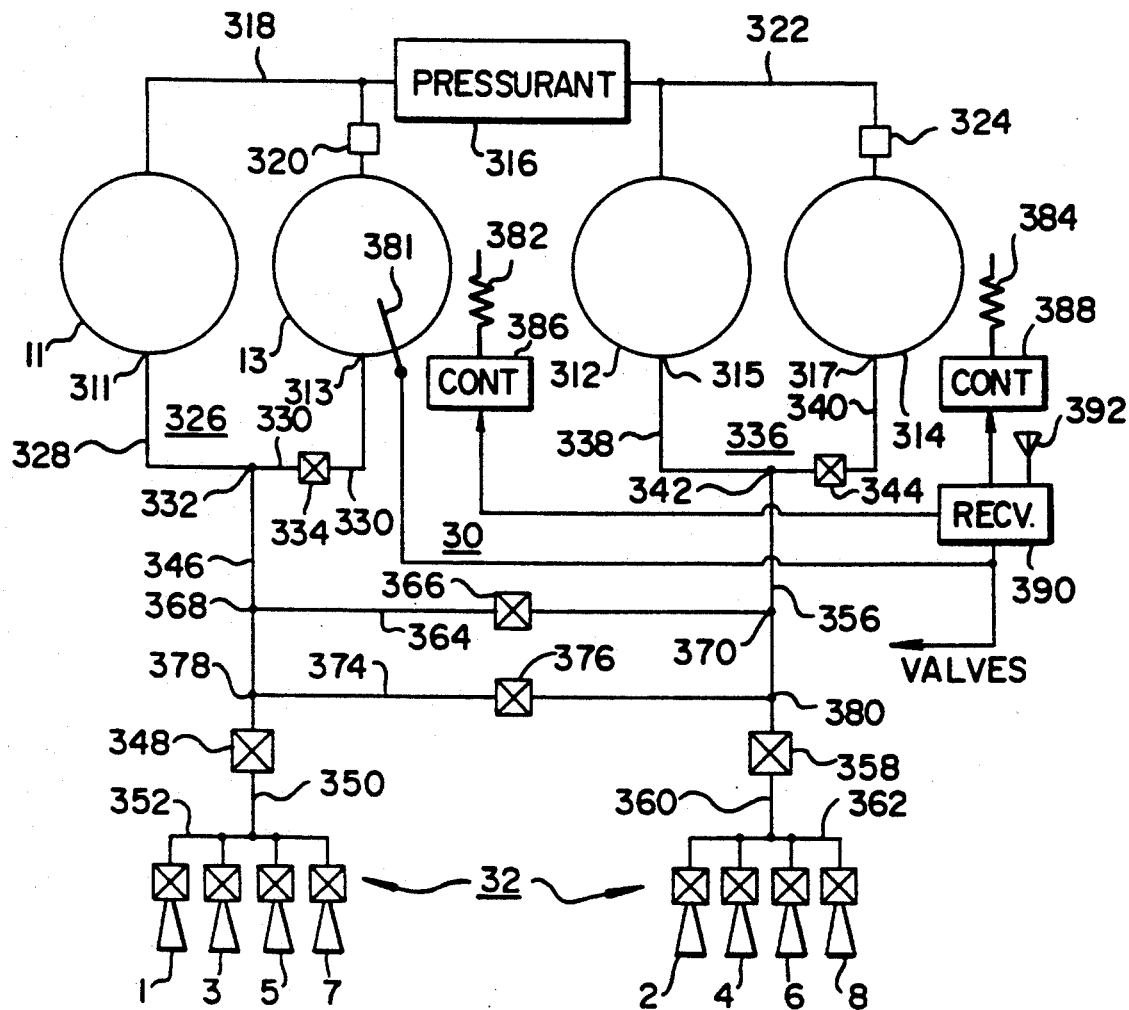
FIG. 3 is a simplified block diagram of a propulsion system for a spacecraft in accordance with the invention.

FIG. 3 is a simplified block diagram of the fuel and propulsion system of spacecraft 30 of FIGS. 1 and 2. In FIG. 3, elements corresponding to those of FIGS. 1 and 2 are designated by the same reference numerals. In FIG. 3, engine 32 includes an odd monopropellant thruster set 1, 3, 5, 7 and an even monopropellant thruster set 2, 4, 6, 8. Propellant tanks 11 and 13 are loaded with a monopropellant fuel, and similar tanks 312 and 314 are also loaded with monopropellant fuel. Tank 314 may be located in upper quadrant 43 of the spacecraft (FIG. 2) together with tank 13, and tank 312 may be located in lower quadrant 41 with tank 11. A tank 316 of pressurant gas such as helium is coupled to tanks 11 and 13 by a distribution manifold 318 and a check valve 320 which is associated with tank 13. Typically, check valve 320 may be doubly redundant, including two series and two parallel paths for reliability. Tank 11 may be provided with a similar check valve (not illustrated). Pressurant tank 316 is also coupled by way of a manifold 322 and a check valve 324 to tanks 312 and 314. Each of propellant tanks 11 and 13 has its fuel outlet port 311, 313, respectively, connected to a manifold 326 having a common point 332. A first branch 328 of manifold 326 extends from fuel output port 311 of tank 11 to common point 332, and a second branch 330 of manifold 326 extends from common point 332 to fuel outlet port 313 of tank 13. Branch 330 of manifold 326 includes a normally-open controllable valve 334. The valve may be of the normally-open, permanently latching type, or it may be reversible, as desired. A pyrotechnically-operated, permanently latching valve may be used for valve 334. In any case, the valve may be remotely controllable by way of antenna 392 and receiver 390. Common point 332 of manifold 326 is connected by way of a pipe 346, a controllable valve 348, and a further pipe 350 to a distribution manifold 352 which distributes fuel to thrusters 1, 3, 5, and 7.

Similarly, the fuel output ports 315 and 317 of tanks 312 and 314, respectively, are connected to a first branch 338 and a second branch 340, respectively, of a propellant manifold 336 having a common point 342. A normally-open controllable valve 344, which may be a pyrovalve, is connected in branch 340 between common point 342 and fuel outlet port 317 of tank 314. From point 342, fuel may flow through pipe 356, through controllable valve 358 and pipe 360 to a fuel distribution manifold 362, which supplies fuel to even thrusters 2, 4, 6, and 8.

In the event that one or more of the even mode thrusters fails in a manner necessitating closure of valve 358, fuel from tanks 312 and 314 may be routed to odd-mode thrusters 1,3 5, and 7 by a redundant path including pipes 364 and 374 and controllable valves 366 and 376, respectively, which extend between connections 368 & 370, and 378 & 380.

Electrical heaters are associated with tanks 13 and 314. In FIG. 3, the heaters associated with tank 13 are represented by a resistor symbol 382, and a resistor symbol 384 represents the electrical heaters associated with tank 314. Those skilled in the art realize that tanks 11 and 312 may also be associated with electrical heaters, and the electrical heaters may be part of a control system which maintains the tank temperatures to keep the fuel from freezing. Heaters 382 and 384 are connected to electrical controllers 386 and 388, respectively, which are connected to a receiver 390, which receives signals picked up by an antenna 392. Receiver 390 is responsive to control signals transmitted from an Earth station to signal controllers 386 and 388 to apply energy from the spacecraft electrical system (not illustrated) to heaters 382 and/or 384, to provide differential heating between the tanks of the tank pairs. Those skilled in the art will understand that this requires disabling or overriding the autonomous temperature control system.

In operation, the spacecraft is launched with a known amount of fuel in tanks 11, 13, 312 and 314. When orbit is achieved, pressurant is released from tank 316 to pressurize the tanks, and a combination of valves 348, 358, 366 and 376 is operated to supply fuel to the thruster manifolds. Each individual thruster may then be operated independently or in conjunction with other thrusters to provide attitude control and/or stationkeeping. During operation, the duration of each thruster operation is noted. If the thrusters are throttleable, the amount of throttling is also noted, and if they are pulsewidth modulated, the duty cycle is noted. This information, together with prelaunch measurement of the fuel consumption of the thrusters, makes it possible to make an estimate of the amount of fuel consumed, and the amount of fuel remaining in each tank.

The amount of fuel in each tank may be estimated at any time by assuming that the tanks empty at the same rate, and by subtracting the consumption from the amount of fuel originally loaded. The tolerance of the measurements and estimates is also known, and therefore the upper and lower limits on the amount of fuel remaining in each tank is also known.

Instead of, or in addition to, keeping records of the usage of propellant, the amount of propellant remaining in each tank may be measured directly. U.S. Pat. No. 4,994,749, issued Feb. 19, 1991 in the name of Davies et al. describes an electronic sensor adapted for measuring the amount of liquid in a spacecraft tank. Copending U.S. patent application Ser. No. 07/663,487, filed Feb. 8, 1991 in the name of Brauer et al., describes a thermal scheme for measuring the amount of liquid in a spacecraft tank, which takes advantage of the tank heaters and which may therefore be particularly well adapted for use herewith. Such measurement schemes may be autonomous, or the measured data may be transmitted from a sensor, illustrated as 381 in FIG. 3, to a ground station, and command data may be returned to the spacecraft by means of antenna 392.

At a time before the fuel in either of the tanks of a set is depleted, for example, at a time before the estimates or measurements indicate that all the fuel in tanks 11 and 13 is depleted or has dropped to a level at which propellant management wicks are not wetted, the fuel remaining in tank 13 is transferred into tank 11 by differential heating. This is accomplished by transmitting a signal from the ground station by way of antenna 392 and receiver 390 to controller 386, instructing the controller to override the autonomous temperature control system, and to apply electrical energy to heating element 382. The temperature of tank 13 is raised relative to that of tank 11, which tends to increase the pressure in tank 13 relative to that in tank 11, driving the remaining fuel from tank 13 through branch 330, normally-open valve 334, and through branch 328 to tank 11. After a sufficient time has elapsed for the fuel transfer to take place, valve 334 is actuated to close branch 330. This isolates tank 13 from tank 11 and from thrusters 1, 3, 5 and 7. Thereafter, thrusters 1, 3, 5, and 7 may be operated, drawing their fuel from tank 11 alone. A similar procedure may be performed with tanks 312 and 314, by heating tank 314 by way of heater 384 to drive fuel from tank 314 to 312, and then activating valve 344 to isolate tank 314 from the combination of tank 312 and even mode thrusters 2, 4, 6, and 8. In order to avoid the need to add a great deal of weight to the spacecraft, it is advantageous to use only the heaters which are provided for maintaining the tanks above freezing. Temperature-maintenance heating normally requires a modest amount of power compared with that which would be required to drive a large amount of fuel from one tank to the other. Consequently, to completely empty tank 13 With a relatively modest temperature difference and therefore a modest power input, it is desirable to initiate the transfer at a time when tank 13 is almost empty of propellant. Under such a condition, a relatively large volume of pressurant gas is present in the tank, compared to the volume of liquid propellant. Those skilled in the art know that heating the tank under these conditions tends to cause a relatively large change in gas volume which is desirable in order to drive out all the liquid propellant.

The amount of propellant which can be transferred from one tank to the other tends to be a direct function of the percentage difference in absolute tank temperature. As an aid to providing sufficient temperature differential between tanks, tanks 11 and 13 may be arranged at locations such as those illustrated in FIG. 2. Then, near or during the last summer solstice before the expected depletion of tanks 11 and 13 is expected, the electrical heating procedure is initiated at a time when the differential heating effect is at a maximum. The environmental heating effect is dependent upon the spacecraft geometry. For a tank geometry such as that described in conjunction with FIGS. 2 and 3, the summer solstice preferentially heats the North face of the satellite, which is adjacent tanks 13 and 314, while the South face, adjacent tanks 11 and 312, is in continuous shade. The other four faces of the satellite undergo a daily cycle of heating and cooling, with each face having a time during which heating is a maximum. For example, the Earth face is preferentially heated at midnight, the anti-earth face at noon, the East face at 6AM, and the West face at 6PM. Thus, if tank 13 is located in quadrant 43 adjacent the East face (i.e. the Northeast octant), with tank 314 in quadrant 43 adjacent the West face (Northwest octant) the tank heaters 382 of tank 13 are preferably energized for propellant transfer near 6AM on the day of the summer solstice, and the tank heater 384 of tank 314 would preferably be energized near 6PM on the same day, in order to maximize the environmental heating affect. The propellant transfer from one tank to the other tank of a set is estimated to take only a few hours, so a transfer of propellant from tank 13 to tank 11 might be initiated by energizing tank heaters 382 at 4AM, with closing of valve 334 set for 8AM, for example, and the transfer from tank 314 to 312 could be accomplished in the interval from 4 to 8 PM. The transfer of fuel may be accomplished at any time if sufficient electrical heating power is available, but the requirement for heaters and heating power is minimized by appropriate timing.

Figure 4:
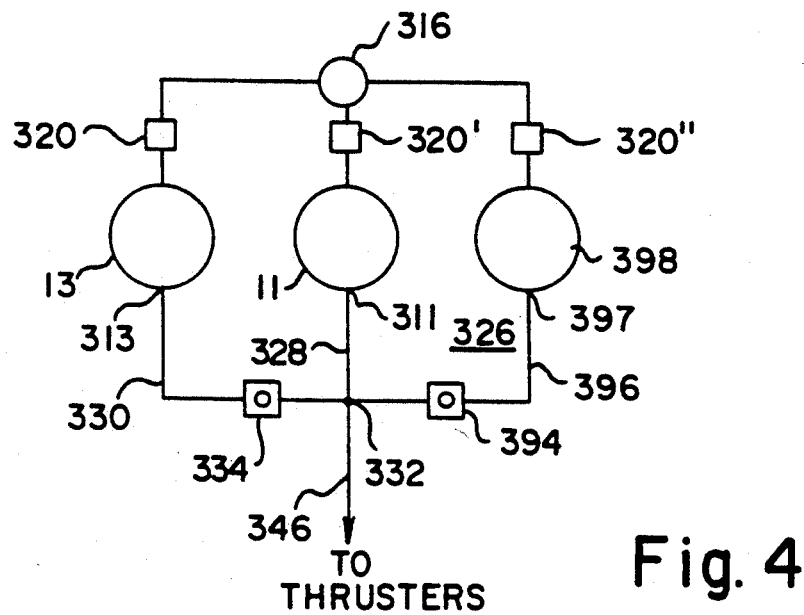
FIG. 4 illustrates a portion of the arrangement of FIG. 3, modified by the addition of a further fuel tank.

FIG. 4 illustrates a portion of the system of FIG. 3, modified by the addition of a third fuel tank. Elements corresponding to those of FIG. 3 are designated by like reference numerals. In FIG. 4, a further fuel tank 398 is associated with tanks 11 and 13, and is interconnected with pressurant tank 316 by way of a check valve 320". Tank 398 is also associated with an electrical heater and a controller. A check valve 320' is associated with tank 11. Fuel distribution manifold 326 of FIG. 5 includes a third branch extending from common point 332 to a fuel outlet port 397 of tank 398. The third branch includes a pipe 396 and a pyrovalve 394. Fuel transfer may be accomplished in a similar manner to that described above, by heating fuel tanks 13 and 398 when they are nearly empty, to drive the remaining fuel into tank 11. Tanks 13 and 398 may be heated simultaneously or sequentially. Sequential operation is preferred because of reduced power requirement when a significant part of the heating is provided by electrical power. Naturally, the same scheme may be extended to four or more tanks interconnected with one manifold.

At the time that valve 334 of FIG. 3 is fired to isolate tank 13 from the thrusters and from tank 11, the expansion of heated propellant gas in tank 13 may be so great that some propellant gas is transferred from tank 13 to tank 11, in addition to all of the fluid propellant. When valve 334 is fired or actuated to a closed condition, branch 328 of manifold 326 may be full of propellant gas, This is not a problem if ordinary monopropellant thrusters are used, because the gas bubble will be purged from the plumbing, and merely results in a momentary deviation in thrust, followed by proper operation when the bubble is purged. If, on the other hand, a mixture of gas insensitive thrusters and gas-sensitive thrusters is used, the gas bubble can be purged, if the volume of the plumbing path from the fluid outlet of tank 11 to the insensitive thrusters is known from initial measurements. The purging is accomplished by using the insensitive thrusters exclusively until such a time as the volume of fuel used equals or is greater than the volume of the plumbing path. The gas will rapidly vent as the insensitive thrusters continue operation. Thereafter the gas-sensitive thrusters may also be used.

A particularly advantageous embodiment of the invention dispenses with pressurant tank 316 of FIG. 3, and also dispenses with the associated manifolds 318, 322 and check valves. Each of the tanks is individually pressurized with its own supply of pressurant gas. This arrangement has the disadvantage that the propellant pressure decreases during the course of spacecraft operation, as propellant is used and the pressurant volume increases. Thus, this technique is used when the thrusters are not too sensitive to pressure changes. Propellant can be transferred between or among the tanks as described above.

Other embodiments of the invention will be apparent to those skilled in the art. For example, when the spacecraft includes bipropellant thrusters, pairs of oxidizer tanks will also be provided, which may be interconnected in pair as described for the monopropellant fuel tanks of FIGS. 3 and 4. Oxidizer may be transferred from one oxidizer tank to another in a manner of similar to that described to reduce the amount of residual or unusable oxidizer.

What is claimed is:

1. A method for operating a spacecraft, which spacecraft includes first and second propellant tanks, each with a gas port and a fluid port, a thruster connected to a propellant manifold, which propellant manifold includes a first branch coupled by way of a controllable valve to said fluid port of said first tank and a second branch coupled to said fluid port of said second tank, a source of pressurant gas, a gas manifold coupled to said source of pressurant gas, said gas manifold including a first branch coupled to said gas port of said second tank and a second branch coupled by way of a check valve to said gas port of said first tank in a manner permitting said first tank to have a higher pressure than said second tank, said method comprising the steps of:
  launching said spacecraft, with said first and second tanks loaded with the same type of propellant;
  from time to time, drawing substantially equal amounts of said propellant from said first and second tanks for operation of said thruster;
  before said propellant in said first tank is exhausted, raising the temperature of said first tank above that of said second tank to thereby raise the pressure in said first tank, thereby to close said check valve, and to drive propellant from said first tank through said manifold toward said second tank;
  during said step of raising the temperature, permanently closing said controllable valve, to thereby close off said first branch of said manifold, and thereby isolate said first tank from said thruster and said second tank;
  from time to time, after said closing step, drawing propellant from said second tank, and not from said first tank, for operating said thruster.

* * * * *